US012541580B2

(12) United States Patent
Hirano et al.

(10) Patent No.: US 12,541,580 B2
(45) Date of Patent: Feb. 3, 2026

(54) INFORMATION PROCESSING APPARATUS, INFORMATION PROCESSING METHOD, AND PROGRAM

(71) Applicant: Sony Group Corporation, Tokyo (JP)

(72) Inventors: Yuki Hirano, Tokyo (JP); Yutaro Maruyama, Tokyo (JP); Tadashi Kamohara, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 95 days.

(21) Appl. No.: 18/570,656

(22) PCT Filed: Jan. 21, 2022

(86) PCT No.: PCT/JP2022/002112
§ 371 (c)(1),
(2) Date: Dec. 15, 2023

(87) PCT Pub. No.: WO2022/269964
PCT Pub. Date: Dec. 29, 2022

(65) Prior Publication Data
US 2024/0281508 A1 Aug. 22, 2024

(30) Foreign Application Priority Data
Jun. 25, 2021 (JP) ................. 2021-105795

(51) Int. Cl.
*G06F 21/31* (2013.01)
*G06F 21/44* (2013.01)

(52) U.S. Cl.
CPC ............ *G06F 21/316* (2013.01); *G06F 21/44* (2013.01); *G06F 2221/2111* (2013.01); *G06F 2221/2117* (2013.01); *G06F 2221/2151* (2013.01)

(58) Field of Classification Search
CPC ................... G06F 21/316; G06F 21/44; G06F 2221/2111; G06F 2221/2117;
(Continued)

(56) References Cited

U.S. PATENT DOCUMENTS 11,210,877 B1 * 12/2021 Amadi ............... G07C 9/00309
2015/0128252 A1    5/2015 Konami
(Continued)

FOREIGN PATENT DOCUMENTS

JP    2015-090589 A    5/2015
JP    2016-523403 A    8/2016
(Continued)

OTHER PUBLICATIONS

International Search Report and Written Opinion mailed on Apr. 12, 2022, received for PCT Application PCT/JP2022/002112, filed on Jan. 21, 2022, 10 pages including English Translation.

*Primary Examiner* — Mohammad W Reza
(74) *Attorney, Agent, or Firm* — XSENSUS LLP

(57) ABSTRACT

An information processing apparatus includes a behavior estimation library and an authentication method switching unit. The behavior estimation library estimates a behavior of a user. The authentication method switching unit switches, based on an estimation result of the behavior, an authentication method of personal authentication among a gait authentication method, an authentication method other than the gait authentication method, and no lock.

17 Claims, 10 Drawing Sheets

(58) Field of Classification Search
CPC .. G06F 2221/2151; G06F 21/31; G06F 21/32; H04L 63/0861; H04L 63/107
See application file for complete search history.

(56) References Cited

U.S. PATENT DOCUMENTS

| | | | |
|---|---|---|---|
| 2016/0055324 A1 | 2/2016 | Agarwal | |
| 2020/0159908 A1* | 5/2020 | Okuyama | G06F 21/45 |
| 2020/0349249 A1* | 11/2020 | Weston | G06V 40/171 |
| 2021/0311554 A1* | 10/2021 | McFarland, Jr. | G06V 40/28 |

FOREIGN PATENT DOCUMENTS

| | | |
|---|---|---|
| JP | 2016-163161 A | 9/2016 |
| JP | 2019-175090 A | 10/2019 |
| JP | 2021-510978 A | 4/2021 |

* cited by examiner

INFORMATION PROCESSING APPARATUS, INFORMATION PROCESSING METHOD, AND PROGRAM

CROSS-REFERENCE TO RELATED APPLICATIONS

The present application is based on PCT filing PCT/JP2022/002112, filed Jan. 21, 2022, which claims priority from Japanese Patent Application No. 2021-105795, filed Jun. 25, 2021, the entire contents of each are incorporated herein by reference.

FIELD

The present invention relates to an information processing apparatus, an information processing method, and a program.

BACKGROUND

An information processing apparatus having a personal authentication function such as fingerprint authentication or face authentication is known. Although the apparatus is useful from the viewpoint of security protection, a user is required to perform an authentication operation for unlocking the apparatus each time the apparatus is started.

CITATION LIST

Patent Literature

Patent Literature 1: JP 2015-090589 A

SUMMARY

Technical Problem

Patent Literature 1 proposes a method of automatically switching an authentication method depending on a surrounding environment such as noise. However, since an authentication operation is required even if the authentication method is changed, the burden on a user is not reduced. In a portable device such as a smartphone, there is also an investigation result indicating that an unlocking operation is performed several tens of times on average per day, which causes a problem in convenience. Therefore, the present disclosure proposes an information processing apparatus, an information processing method, and a program capable of achieving both security and convenience.

Solution to Problem

According to the present disclosure, an information processing apparatus is provided that comprises: a behavior estimation library configured to estimate a behavior of a user; and an authentication method switching unit configured to switch, based on an estimation result of the behavior, an authentication method of personal authentication among a gait authentication method, an authentication method other than the gait authentication method, and no lock. According to the present disclosure, an information processing method in which an information process of the information processing apparatus is executed by a computer, and a program causing a computer to perform the information process of the information processing apparatus are provided.

DESCRIPTION OF EMBODIMENTS

Figure 1:
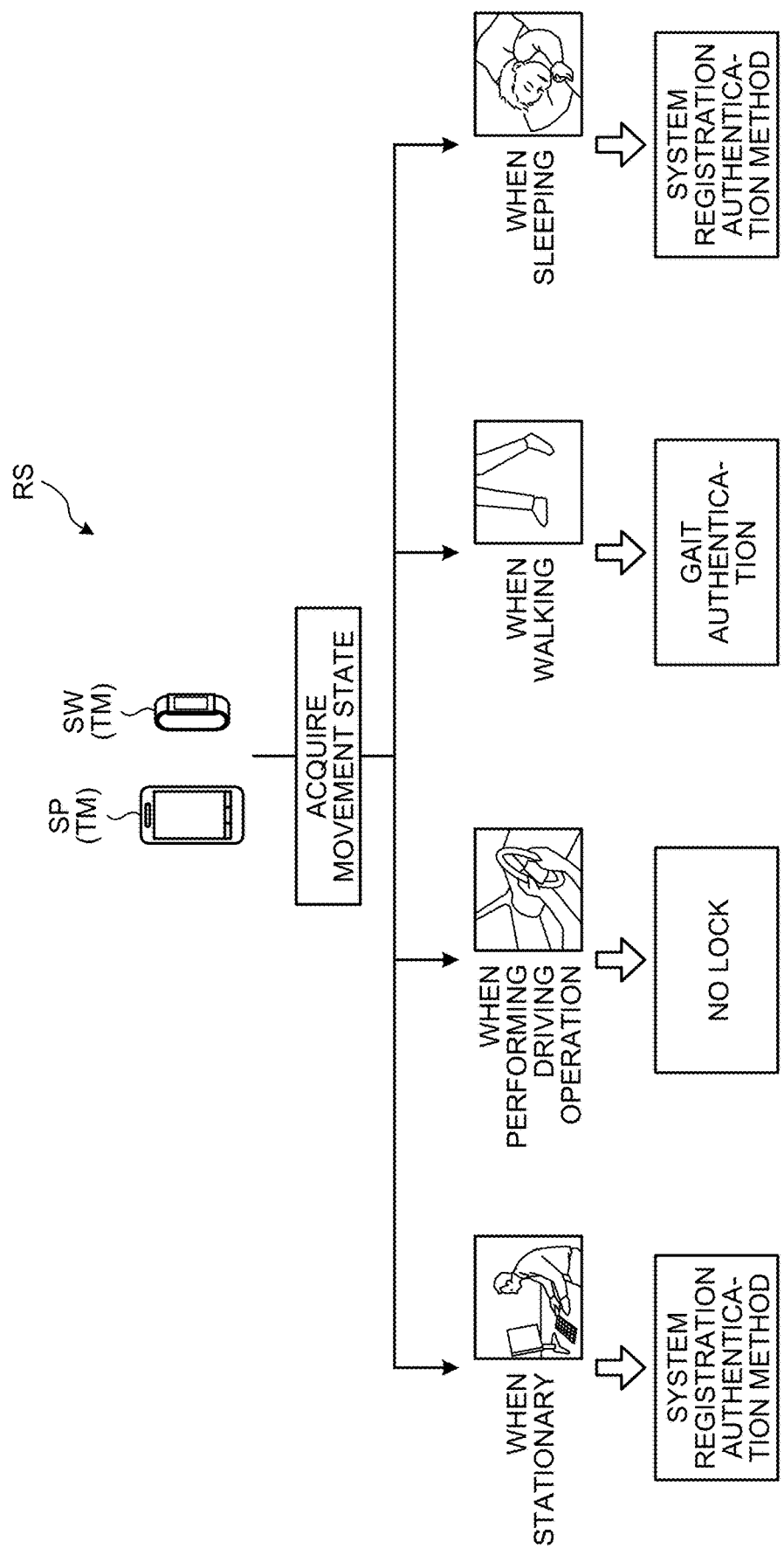
FIG. 1 is a diagram illustrating an outline of an unlocking function of the present disclosure.

Hereinafter, embodiments of the present disclosure will be described in detail with reference to the drawings. In the following embodiments, the same parts are denoted by the same reference numerals, and redundant description will be omitted.

It is noted that a description will be given in the following order.

[1. Outline of unlocking function]
[2. Architecture of unlocking system]
[3. Description of various registration/setting functions]
[3-1. Addition of activity based on behavior analysis]
[3-2. Notification of security alert]
[4. Information processing method]
[5. Hardware configuration example of information terminal]
[6. Effects]
[7. Others]

1. Outline of Unlocking Function

FIG. 1 is a diagram illustrating an outline of an unlocking function of the present disclosure.

An unlocking system RS performs an unlocking function of an information terminal TM. In the example of FIG. 1, a smartphone SP, a smartwatch SW, and the like are illustrated as examples of the information terminal TM, but the information terminal TM is not limited thereto. The unlocking function of the present disclosure may be applied to another information processing apparatus such as a tablet terminal or a personal computer.

The unlocking system RS switches an authentication method of personal authentication depending on a behavior performed by a user. For example, a gait authentication method is adopted when the user walks. When the user performs driving operation, no lock in which security lock is not performed is adopted. An authentication method (a system registration authentication method) other than gait authentication set by an operating system (OS) is adopted when a user is stationary and asleep. The system registration authentication method is, for example, a knowledge authentication method using an ID or a password, but may be another authentication method (a fingerprint authentication method, a face authentication method, or the like).

2. Architecture of Unlocking System

Figure 2:
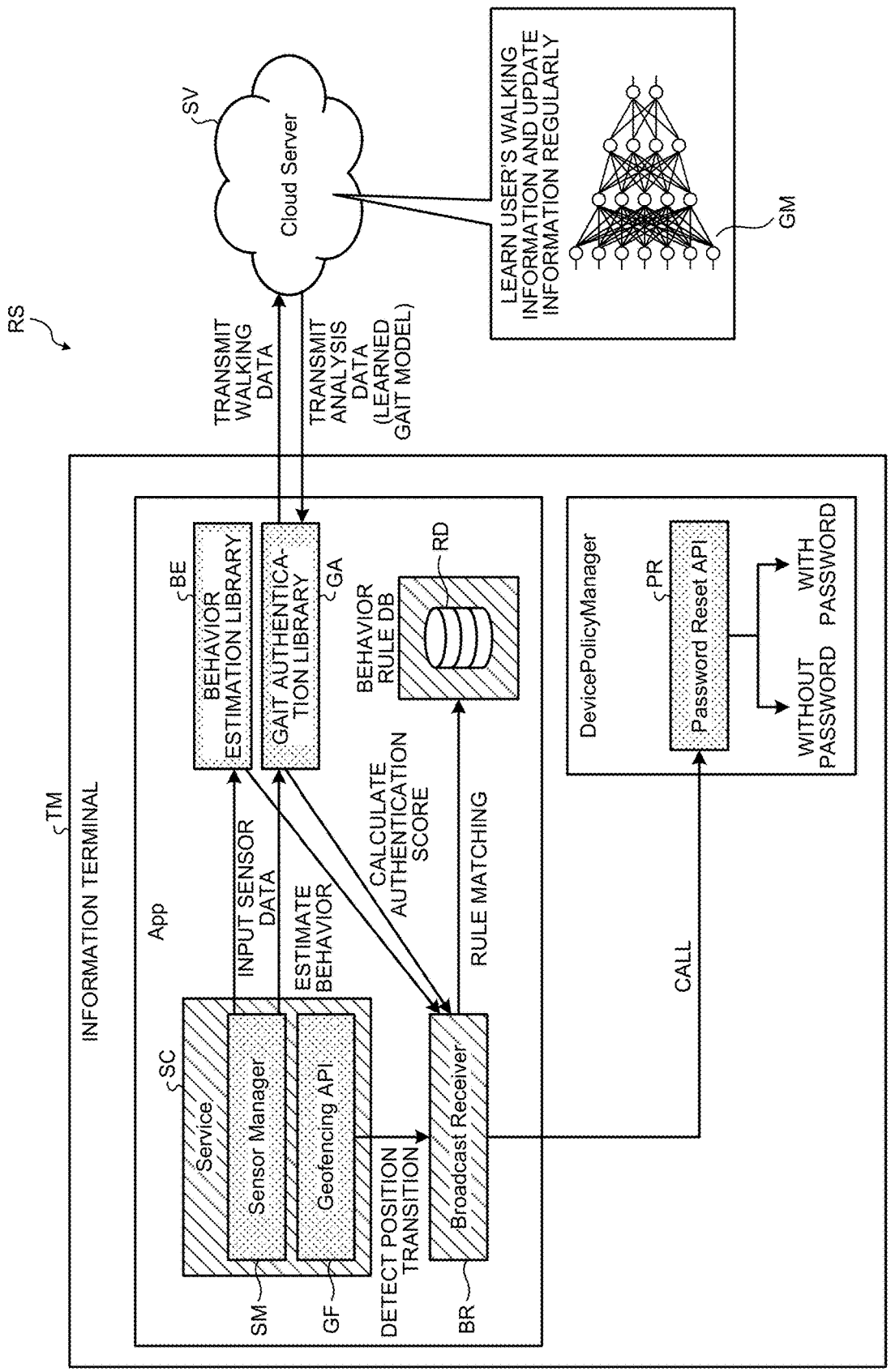
FIG. 2 is a diagram illustrating an example of an architecture of an unlocking system.

FIG. 2 is a diagram illustrating an example of architecture of the unlocking system RS.

The unlocking system RS performs gait authentication using a gait model GM generated by a cloud server SV. The gait model GM outputs a matching degree between a way of walking of a registered person (person himself or herself) and a way of walking detected from walking data as an authentication score. The gait model GM is obtained by causing a neural network to perform machine learning of a walking feature. The information terminal TM supplies walking information of the user (person himself or herself) to the cloud server SV. The cloud server SV learns the way of walking of the user using the acquired walking information, and generates and updates the gait model GM.

The information terminal TM is an information processing apparatus that processes various types of information. The information terminal TM includes, as components of an application, a service SC, a broadcast receiver BR, a behavior estimation library BE, a gait authentication library GA, and a behavior rule database RD. The service SC operates in the background.

The service SC includes a sensor manager SM and a geofencing GF. The sensor manager SM acquires sensor data from various sensors built in the information terminal TM. The information terminal TM includes, for example, a gyro sensor, a global positioning system (GPS) sensor, a proximity sensor, a distance measuring sensor, an illuminance sensor, and the like as built-in sensors.

The geofencing GF generates a virtual boundary around a preset location using, for example, a GPS satellite network or a local radio frequency identifier (such as a Wi-Fi (registered trademark) node or a Bluetooth (registered trademark) beacon). The geofencing GF detects that the user has moved from the outside of the virtual boundary to the inside thereof and that the user has moved from the inside of the virtual boundary to the outside thereof.

The behavior estimation library BE estimates the behavior of the user based on the sensor data. For example, the behavior estimation library BE detects movement and position of the user and surrounding brightness thereof based on the sensor data of the gyro sensor, the GPS sensor, and the illuminance sensor. The behavior estimation library BE estimates a behavior type such as a stationary state, a driving operation state, a walking state, and a sleeping state based on movement information of the user. The behavior estimation library BE can improve behavior estimation accuracy by taking into account position information of the user, surrounding brightness information thereof, and the like. As a technique for recognizing a user's behavior, it is possible to use known techniques disclosed in JP 5028751 B2, JP 2010-198595 A, and the like.

The gait authentication library GA acquires, as walking data, sensor data in a period estimated as the walking state in the behavior estimation library BE among the pieces of sensor data output from the gyro sensor. The gait authentication library GA transmits the walking data to the cloud server SV. The cloud server SV inputs the walking data to the neural network to generate the gait model GM. The gait authentication library GA acquires the generated gait model GM from the cloud server SV. The gait authentication library GA inputs the walking data to the gait model GM to acquire an authentication score.

The broadcast receiver BR receives various messages and pieces of information transmitted to an application by the information terminal TM. The broadcast receiver BR functions as an authentication method switching unit that switches an authentication method based on the received message and information. For example, the broadcast receiver BR switches the authentication method of personal authentication among a gait authentication method, a system registration authentication method (an authentication method other than the gait authentication method), and no lock based on a behavior estimation result (behavior type of the user) by the behavior estimation library BE. The broadcast receiver BR can also determine the authentication method based on a transition result of the user's position detected by the geofencing GF.

The authentication method is determined using the behavior rule database RD. In the behavior rule database RD, a rule related to a combination of the behavior type and the authentication method is defined. For example, in the behavior rule database RD, the authentication method to be adopted is defined for each behavior type. The broadcast receiver BR determines the authentication method according to a rule defined in the behavior rule database RD.

The information terminal TM includes a password reset PR as a component of a device policy manager. The password reset PR manages a password used for knowledge authentication (the system registration authentication method). When an unlocking operation is performed while a user is stationary and asleep, the broadcast receiver BR performs the personal authentication using information of the password called from the password reset PR.

3. Description of Various Registration/Setting Functions

The information terminal TM performs various types of processing related to an unlocking function. This processing includes rule setting regarding a combination of a behavior type and an authentication method, a notification based on an authentication result, and the like. Hereinafter, a specific description will be given.

[3-1. Addition of Activity Based on Behavior Analysis]

Figure 3:
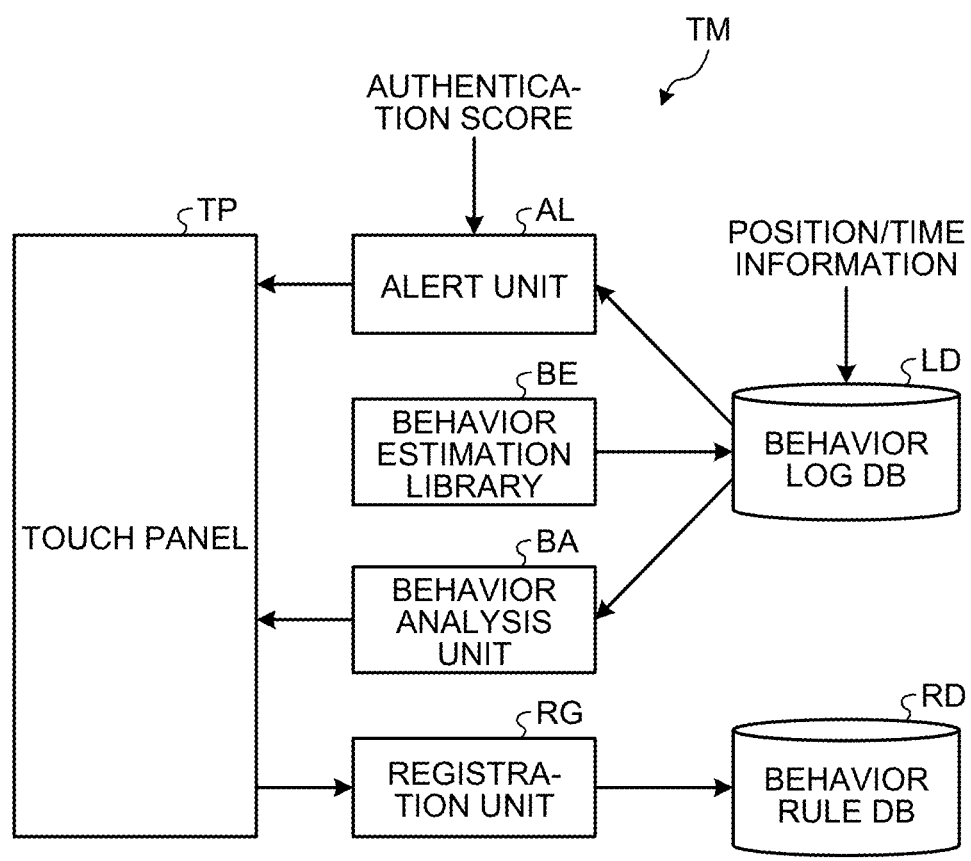
FIG. 3 is a diagram illustrating a functional configuration of an information terminal.
Figure 4:
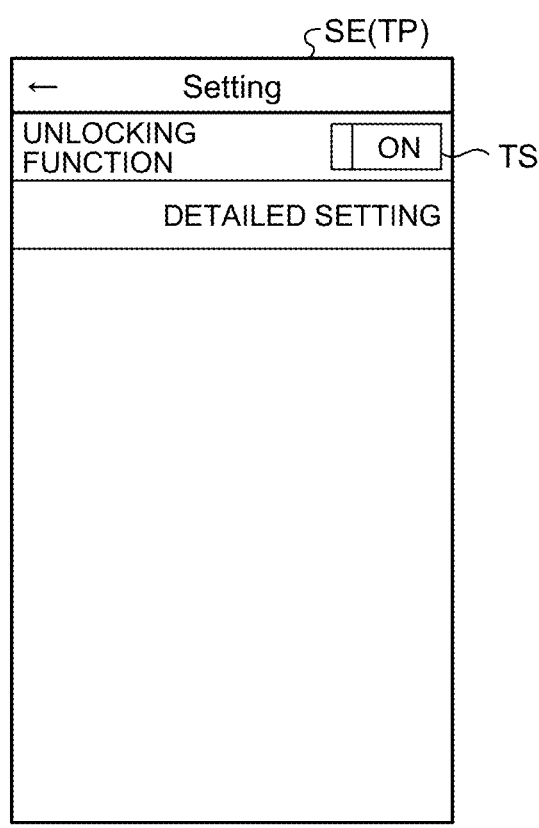
FIG. 4 is a diagram illustrating an example of a setting screen on which rule setting is performed.
Figure 5:
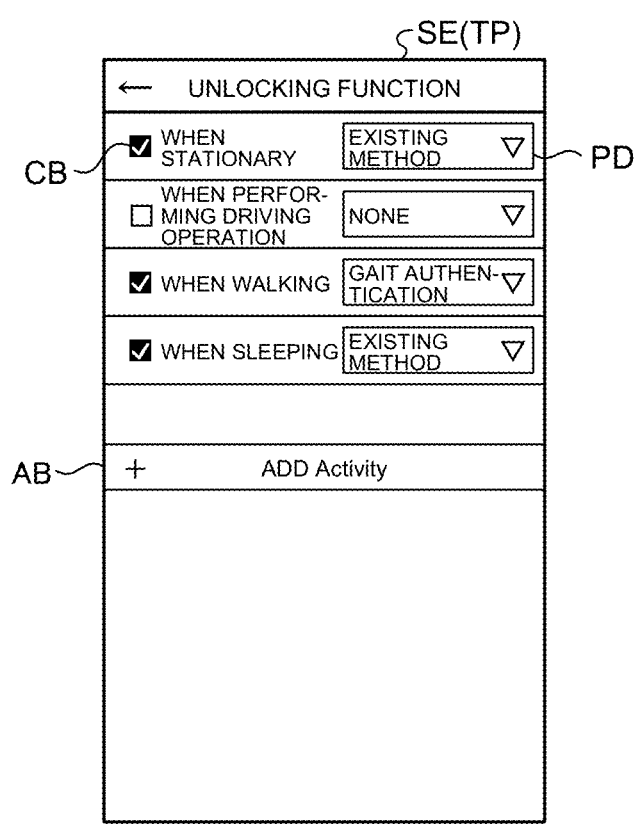
FIG. 5 is a diagram illustrating an example of the setting screen on which rule setting is performed.
Figure 6:
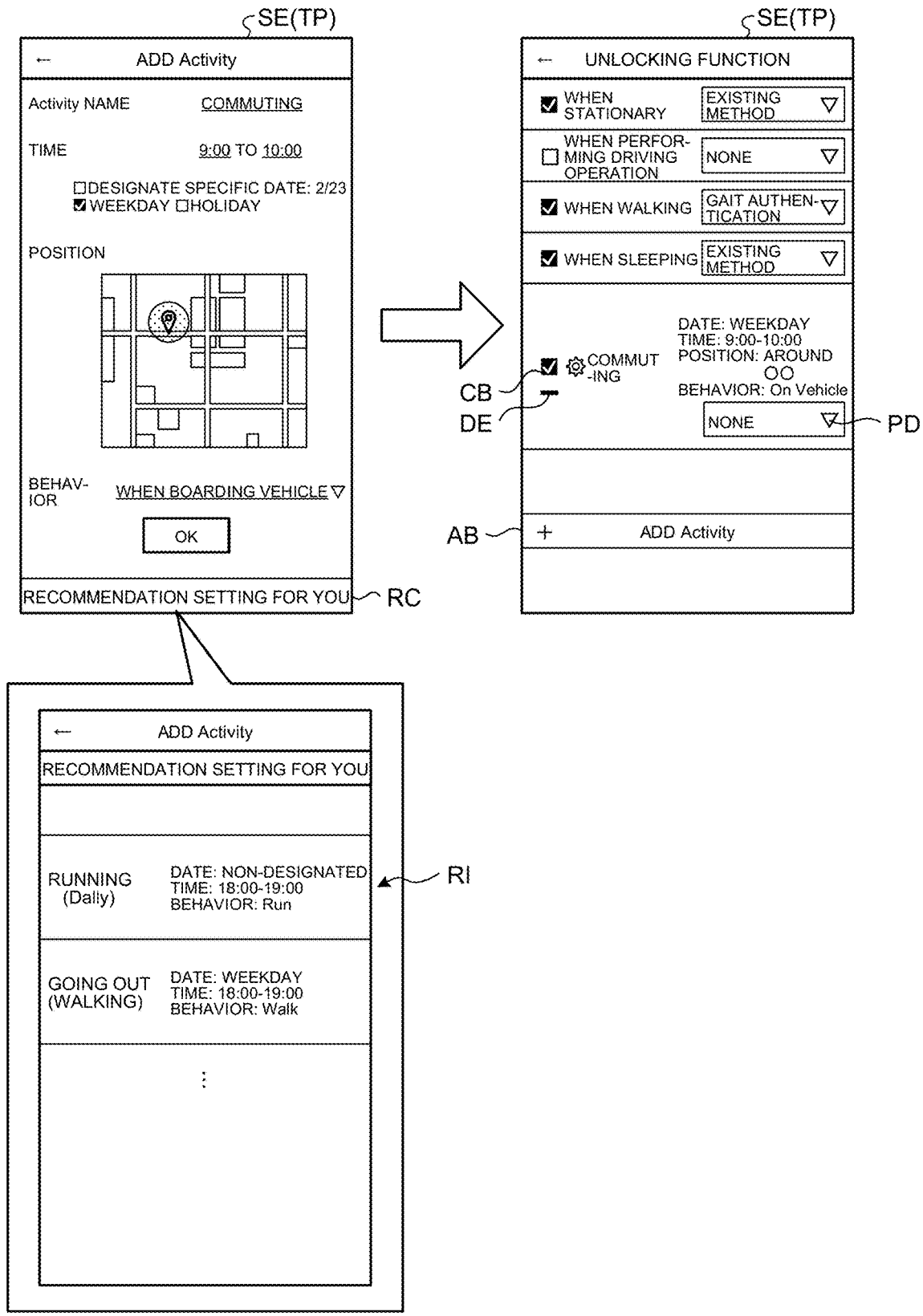
FIG. 6 is a diagram illustrating an example of the setting screen on which rule setting is performed.

FIG. 3 is a diagram illustrating a functional configuration of the information terminal TM. FIGS. 4 to 6 are diagrams illustrating an example of a setting screen SE on which rule setting is performed.

The information terminal TM includes an alert unit AL, a behavior analysis unit BA, a registration unit RG, and a behavior log database LD. The behavior log database LD stores log information of a behavior of a user estimated by the behavior estimation library BE. In the behavior log database LD, a behavior history of a user is stored in association with a position and a time at which a behavior is performed.

The behavior analysis unit BA estimates the activity of the user based on the behavior history of the user. The behavior analysis unit BA presents the estimated activity as recommendation information RI (refer to FIG. 6). The recommendation information RI is displayed on a touch panel TP mounted on the information terminal TM. The user can assign a desired authentication method with respect to the activity. The registration unit RG registers, in the behavior rule database RD, the authentication method assigned based on the recommendation information RI in association with the activity.

For example, in the example of FIG. 4, ON/OFF of the unlocking system RS is switched by a toggle switch TS.

Turning on the unlocking system RS enables a tab of detailed settings located under the toggle switch TS. When the tab of the detailed settings is tapped, the setting screen SE as illustrated in FIG. 5 is displayed.

In the setting screen SE of FIG. 5, "when a user is stationary", "when a user performs a driving operation", "when a user walks", and "when a user is asleep" are defined as default behavior types. The user can set an authentication method for each behavior type by using a pull-down switch PD displayed on the right side of the behavior type. A check box CK is displayed on the left side of the behavior type. The user can set whether or not to enable the assignment of the authentication method for each behavior type.

In the example of FIG. 5, an "existing method" is assigned to "when a user is stationary" and "when a user is asleep", "none" is assigned to "when a user performs a driving operation", and "gait authentication" is assigned to "when a user walks". The "existing method" is a system registration authentication method, and the "none" means that security lock is not performed (no lock). The assignment of the authentication method with respect to "when a user is stationary", "when a user walks", and "when a user is asleep" is enabled, but the assignment of the authentication method with respect to "when a user performs a driving operation" is disabled.

Under the default behavior type, an activity addition button AB is displayed. When the addition button AB is tapped, the setting screen SE as illustrated in FIG. 6 is displayed. The user can add any routine activity as a new behavior type using the setting screen SE in FIG. 6. Input fields related to "activity name", "time", "position", and "behavior" are displayed on the setting screen SE. The user can assign a specific activity name to a routine behavior performed in a specific temporal and spatial range.

When the input of the activity is completed, the registration unit RG adds a new behavior type specified by the "activity name" under the default behavior type. In the example of FIG. 6, a behavior type named "commuting" is added. The user can assign a desired authentication method to the new behavior type by using the pull-down switch PD. In the example of FIG. 6, since the behavior at the time of commuting is movement by car, "none" in which the security lock is not performed is assigned. The registration unit RG registers, in the behavior rule database RD, the assigned authentication method in association with the activity.

A delete button DE is displayed on the left side of the manually added behavior type. The user can delete a behavior type other than the default behavior types (stationary, driving operation, walking, and sleeping) by using the delete button DE.

A tab RC for displaying the recommendation information RI is displayed under the activity input screen. When the tab RC is tapped, a list of one or more routine activities detected by the behavior analysis unit BA is displayed. In the list, information related to "date", "time", and "behavior" is displayed for each activity. The "date" indicates information such as a day of the week on which the activity is performed. When a specific activity displayed in the list is tapped, the tapped activity is added as a new behavior type. The information on the "date", "time", and "behavior" displayed in the list is applied to the added behavior type.

[3-2. Notification of Security Alert]

Figure 7:
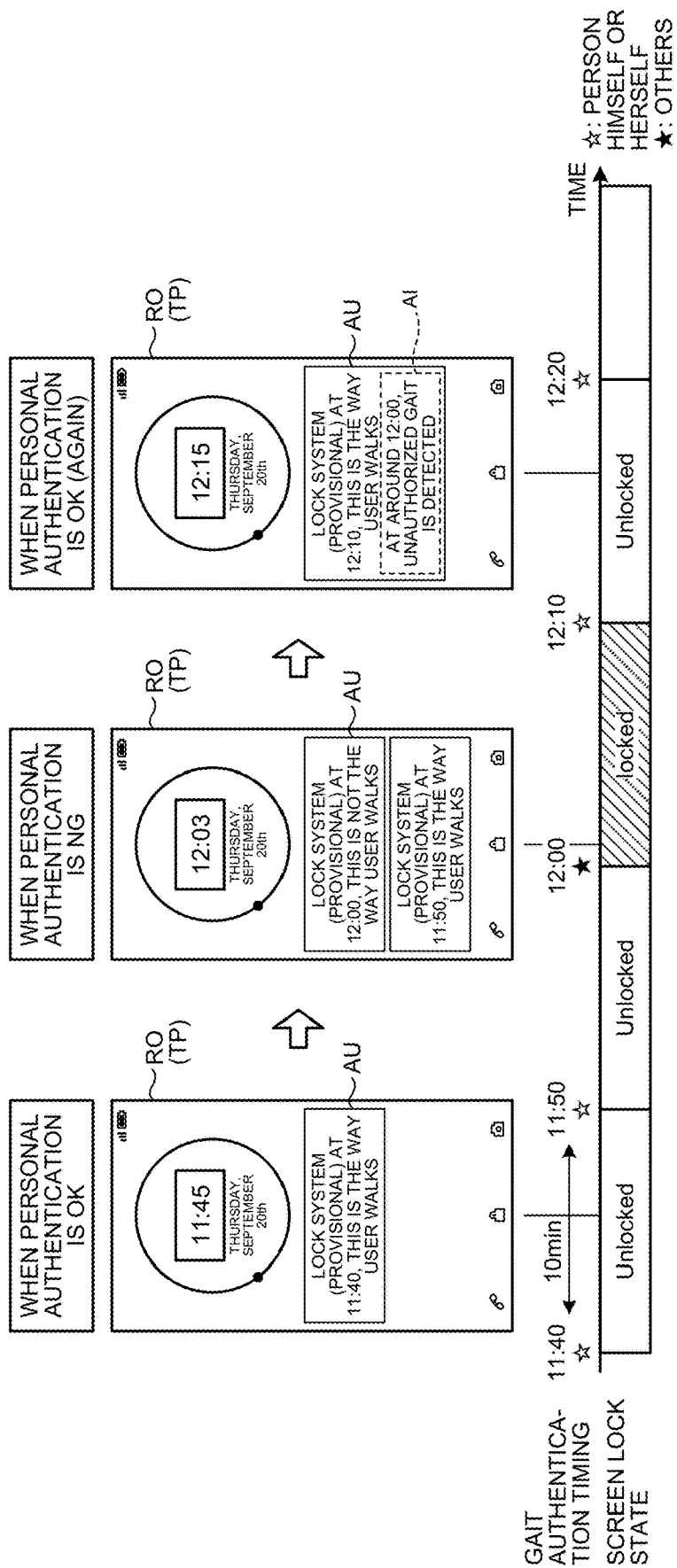
FIG. 7 is a diagram illustrating a notification example of a security alert.

FIG. 7 is a diagram illustrating a notification example of a security alert AI.

In a period during which gait authentication is performed, the alert unit AL displays information (authentication information AU) related to an authentication result on a lock screen RO at regular time intervals. The alert unit AL notifies the lock screen RO of the security alert AI when the personal authentication is not performed by the gait authentication method.

In the example of FIG. 7, the authentication information AU is displayed on the lock screen RO every 10 minutes. The personal authentication is successful until 12:00. Therefore, the security lock is released, and the authentication information AU displays that an owner of the information terminal TM is a user himself or herself. The personal authentication fails in the period from 12:00 to 12:10. The security lock is not released, and the authentication information AU displays that an owner of the information terminal TM is not a user himself or herself. After 12:10, the personal authentication is successful again. Therefore, the security lock is released, and the fact that an owner of the information terminal TM is a user himself or herself is displayed in the authentication information AU, but the security alert AI regarding unauthorized use is added to the authentication information AU.

Figure 8:
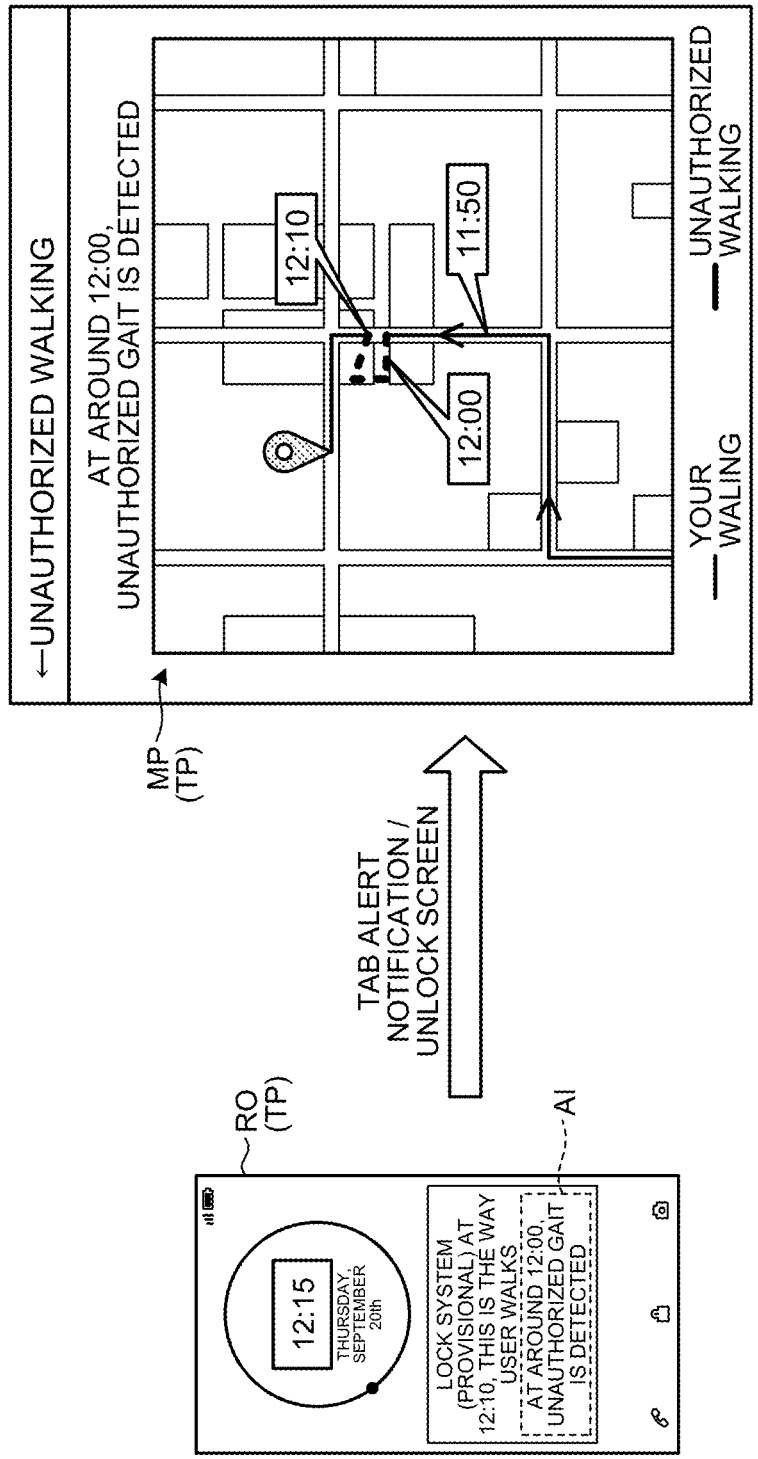
FIG. 8 is a diagram illustrating a presentation example of log information in an unauthorized use period.

FIG. 8 is a diagram illustrating a presentation example of log information in an unauthorized use period.

In a case where an operation (tap or the like) on the security alert AI is detected, the alert unit AL presents log information on a period during which the personal authentication is not performed after the lock is released. For example, the log information includes time information and position information in the period during which the personal authentication is not performed. The log information is displayed on the touch panel TP in the form of a map or the like. In the example of FIG. 8, the alert unit AL reflects and presents the log information in a map MP. The alert unit AL displays walking routes in a period during which the personal authentication has succeeded and a period during which the personal authentication fails in a distinguishable manner by changing the type and thickness of a line or performing color coding or the like.

4. Information Processing Method

Figure 9:
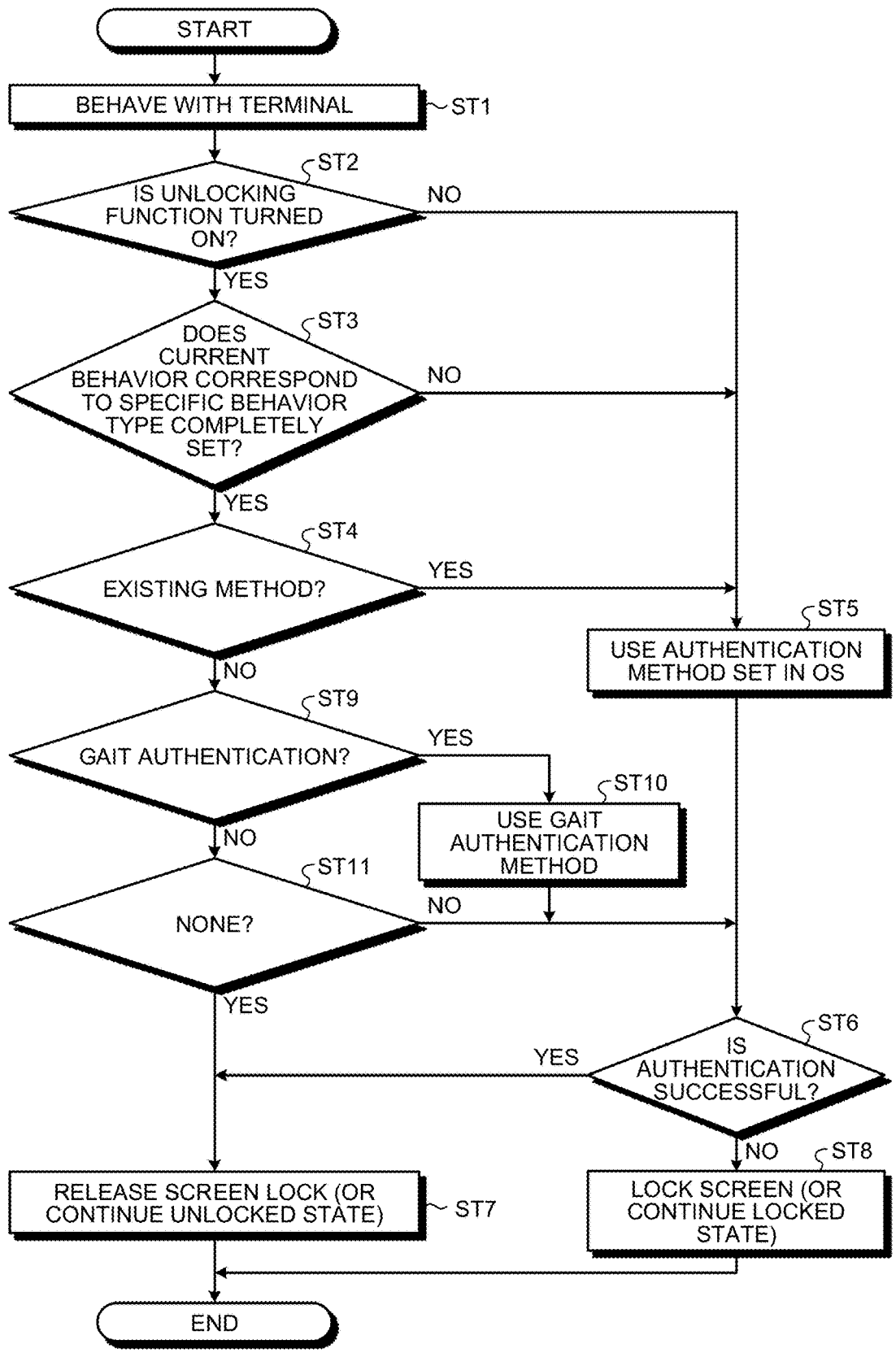
FIG. 9 is a diagram illustrating an example of an information processing method related to lock release.

FIG. 9 is a diagram illustrating an example of an information processing method related to lock release.

When a user behaves with the information terminal TM (step ST1), the information terminal TM determines whether the unlocking function of the present disclosure described above is turned ON (step ST2). In step ST2, when it is determined that the unlocking function of the present disclosure is turned ON (step ST2: Yes), the behavior estimation library BE determines whether the currently detected behavior corresponds to a specific behavior type set on the setting screen SE (step ST3).

In step ST3, when it is determined that the current behavior corresponds to the specific behavior type (step ST3: Yes), the broadcast receiver BR determines whether an authentication method assigned to the behavior type is the "existing method" (step ST4).

In step ST4, when the assigned authentication method is the "existing method" (step ST4: Yes), the broadcast receiver BR determines whether personal authentication has succeeded by using a system registration authentication method set in the OS (steps ST5 and ST6). When the personal authentication has succeeded (step ST6: Yes), the locked state is switched to the unlocked state, or the unlocked state is maintained (step ST7). When the personal authentication fails (step ST6: No), the unlocked state is switched to the locked state, or the locked state is maintained (step ST8).

When the assigned authentication method is not the "existing method" in step ST4 (step ST4: No), the broadcast receiver BR determines whether the authentication method assigned to the behavior type is "gait authentication" (step ST9).

In step ST9, when the assigned authentication method is the "gait authentication" (step ST9: Yes), the broadcast receiver BR determines whether the personal authentication has succeeded by using the gait authentication method (step ST10 and step ST6). The flow after step ST6 is the same as that described above (steps ST7 and ST8).

In step ST9, when the assigned authentication method is not "the gait authentication" (step ST9: No), the broadcast receiver BR determines whether the authentication method assigned to the behavior type is "none" (step ST11). In step ST11, when the assigned authentication method is "none" (step ST11: Yes), the broadcast receiver BR switches from the locked state to the unlocked state or maintains the unlocked state (step ST7).

When the assigned authentication method is not "none" in step ST11 (step ST11: No), the currently detected behavior is not a default behavior type but a behavior type added on the setting screen SE. The broadcast receiver BR extracts an authentication method corresponding to the added behavior type from the behavior rule database RD. The broadcast receiver BR determines whether the personal authentication has succeeded with the extracted authentication method (step ST6). The flow after step ST6 is the same as that described above (steps ST7 and ST8).

In step ST3, when it is determined that the current behavior does not correspond to the specific behavior type (step ST3: No), and in step ST2, when it is determined that the unlocking function of the present disclosure is turned OFF (step ST2: No), the broadcast receiver BR adopts the system registration authentication method (step ST5). The flow after step ST5 is the same as that described above (steps ST6 to ST8).

5. Hardware Configuration Example of Information Terminal

Figure 10:
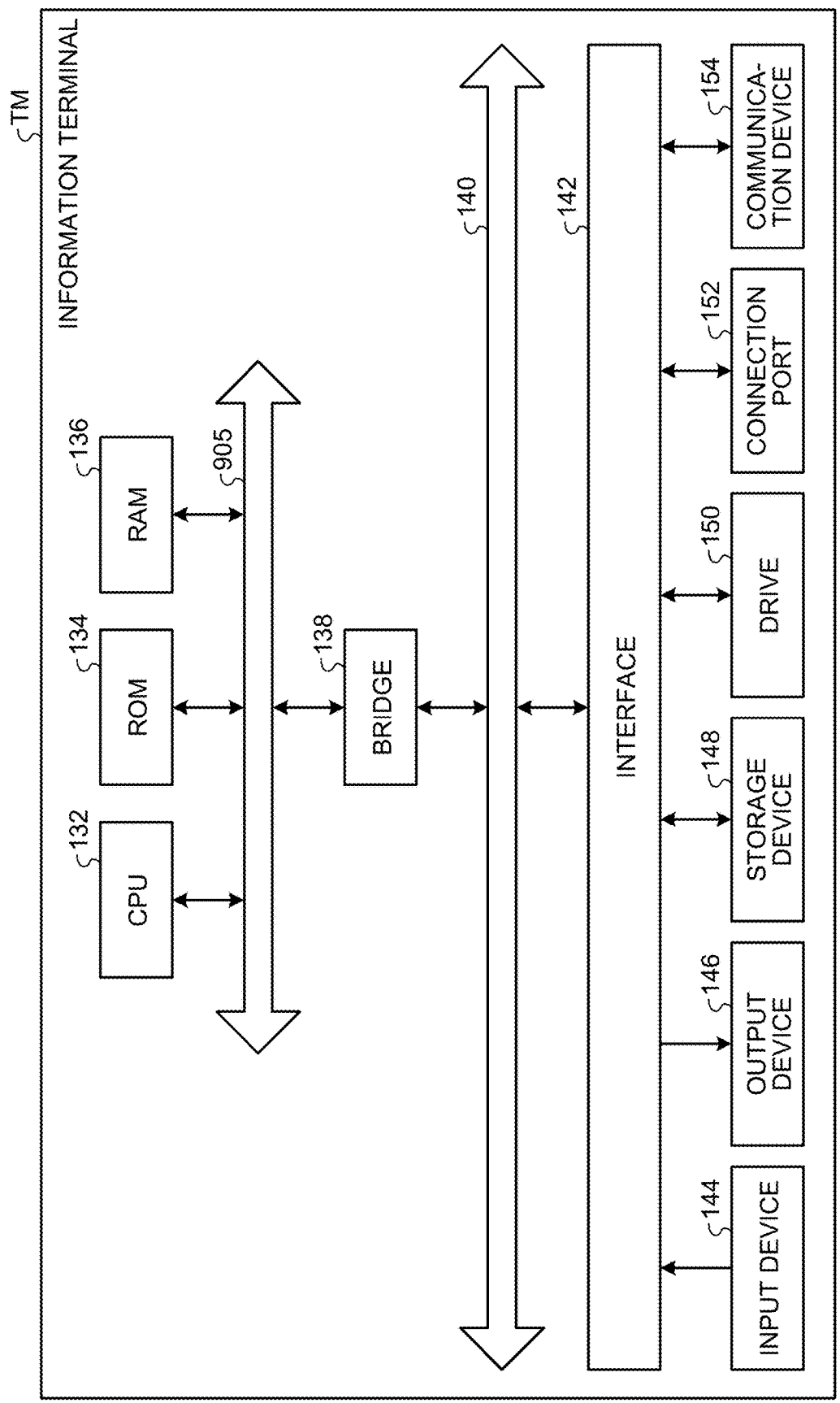
FIG. 10 is a diagram illustrating a hardware configuration example of the information terminal.

FIG. 10 is a diagram illustrating a hardware configuration example of the information terminal TM.

For example, the information terminal TM includes a central processing unit (CPU) 132, a read only memory (ROM) 134, a random access memory (RAM) 136, a bridge 138, a bus 140, an interface 142, an input device 144, an output device 146, a storage device 148, a drive 150, a connection port 152, and a communication device 154.

The CPU 132 functions as an arithmetic processing device and a control device, and realizes the operation of each functional unit in the information terminal TM in cooperation with various programs. The CPU 132 may be a microprocessor. The ROM 134 stores programs, operation parameters, or the like used by the CPU 132. The RAM 136 temporarily stores programs used in the execution of the CPU 132, parameters that appropriately change in the execution, and the like. The CPU 132, the ROM 134, and the RAM 136 are connected to each other by an internal bus including a CPU bus and the like.

The input device 144 includes various input means configured to allow a user to input information, such as a mouse, a keyboard, a touch panel, a button, a microphone, a switch, and a lever, and an input control circuit configured to generate an input signal based on information obtained from a sensor included in the information terminal TM and an input by the user and to output the input signal to the CPU 132. By operating the input device 144, the user of the information terminal TM can input various pieces of data to the information terminal TM and instruct the information terminal TM to perform a processing operation.

As an example of a display unit of the information terminal TM, the output device 146 performs an output to a device such as a liquid crystal display (LCD) device, an organic light emitting diode (OLED) device, or a lamp. Furthermore, the output device 146 may perform an audio output by a speaker, a headphone, or the like.

The storage device 148 is a device for storing data. The storage device 148 may include a storage medium, a recording device that records data in the storage medium, a reading device that reads data from the storage medium, a deletion device that deletes the data recorded in the storage medium, and the like. The storage device 148 stores programs executed by the CPU 132 and various pieces of data. The programs are stored in, for example, a non-transitory computer-readable storage medium.

The drive 150 is a reader/writer for a storage medium, and is built in or externally attached to the information terminal TM. The drive 150 reads information recorded in a removable storage medium such as a mounted magnetic disk, optical disk, magneto-optical disk, or semiconductor memory, and outputs the information to the RAM 136. Furthermore, the drive 150 can also write information to the removable storage medium.

The connection port 152 is, for example, a bus for being connected to a peripheral device outside the information terminal TM. The connection port 152 may be a universal serial bus (USB).

The communication device 154 is, for example, a communication interface including a communication device for being connected to a network. The communication device 154 may be an infrared communication-compatible device, a wireless local area network (LAN)-compatible communication device, a long term evolution (LTE)-compatible communication device, or a wire communication device that performs wired communication.

6. Effects

The information terminal TM includes the behavior estimation library BE and the broadcast receiver BR. The behavior estimation library BE estimates a user's behavior. The broadcast receiver BR switches an authentication method of personal authentication among a gait authentication method, an authentication method other than the gait authentication method, and no lock based on the estimation result of the behavior. In the information processing method of the present disclosure, processing of the information terminal TM is executed by a computer. The program of the present disclosure causes the computer to realize processing of the information terminal TM.

According to this configuration, a seamless unlocking function depending on a behavior situation of a user is realized. Since the gait authentication method does not require a special authentication operation, convenience is high. Under certain conditions where safety is ensured, such as "when a user performs a driving operation", it may be beneficial to remove the security lock and prioritize convenience. By combining the gait authentication and the no lock, the number of required authentication operations is reduced, and both security and convenience are achieved.

The information terminal TM includes the behavior analysis unit BA and the registration unit RG. The behavior analysis unit BA estimates the activity of the user based on the behavior history of the user. The behavior analysis unit BA presents the estimated activity as the recommendation information RI. The registration unit RG registers, in the behavior rule database RD, the authentication method assigned based on the recommendation information RI in association with the activity.

According to this configuration, it is possible to set an appropriate authentication method depending on activity.

The broadcast receiver BR adopts the gait authentication method "when a user walks", adopts the authentication method other than the gait authentication method "when a user is stationary and asleep", and adopts the no lock "when a user performs a driving operation".

According to this configuration, a highly convenient unlocking function that eliminates the burden of an authentication operation as much as possible is realized.

The information terminal TM includes the alert unit AL. The alert unit AL notifies the lock screen RO of the security alert AI when the personal authentication is not performed by the gait authentication method.

According to this configuration, it is possible to call attention to unauthorized use by others.

In a case where an operation on the security alert AI is detected, the alert unit AL presents log information on a period during which the personal authentication is not performed after the lock is released.

According to this configuration, detailed information on the unauthorized use can be obtained.

The log information includes time information and position information in the period during which the personal authentication is not performed.

According to this configuration, it is possible to recognize when and where unauthorized use has been performed.

The alert unit AL reflects and presents the log information in the map MP.

According to this configuration, it is easy to specify a behavior of a person who has performed unauthorized use.

It is noted that the effects described in the present specification are merely examples and are not limited, and other effects may be obtained.

7. Others

In the above embodiment, an authentication method of personal authentication is switched based on a behavior of a user. However, a function switching method based on a behavior can also be applied to other fields. For example, it is also possible to switch a music playlist or switch available (function limited) applications/functions depending on the user's behavior. For example, in the former example, it is conceivable to select Jazz "when a user is stationary", a drive song "when a user performs a driving operation", a song with a low tempo/an up tempo "when a user walks/runs", and a song that calms a user down "when a user is asleep". In the latter example, it is conceivable to perform no function restriction "when a user is stationary", disable all functions requiring a touch operation "when a user performs a driving operation", disable SNS or a browser "when a user walks", and disable Youtube (registered trademark) or a browser "when a user is asleep".

SUPPLEMENTARY NOTE

It is noted that the present technique can also have the following configurations.

(1)
An information processing apparatus comprising:
a behavior estimation library configured to estimate a behavior of a user; and
an authentication method switching unit configured to switch, based on an estimation result of the behavior, an authentication method of personal authentication among a gait authentication method, an authentication method other than the gait authentication method, and no lock.

(2)
The information processing apparatus according to (1), further comprising:
a behavior analysis unit configured to estimate an activity of the user based on a behavior history of the user and to present the estimated activity as recommendation information; and
a registration unit configured to register, in a behavior rule database, the authentication method assigned based on the recommendation information in association with the activity.

(3)
The information processing apparatus according to (1) or (2), wherein
the authentication method switching unit adopts the gait authentication method when the user walks, adopts the authentication method other than the gait authentication method when the user is stationary and asleep, and adopts the no lock when the user performs a driving operation.

(4)
The information processing apparatus according to (3), further comprising
an alert unit configured to notify a lock screen of a security alert when the personal authentication is not performed by the gait authentication method.

(5)
The information processing apparatus according to (4), wherein
the alert unit presents, when an operation on the security alert is detected, log information on a period during which the personal authentication is not performed after lock is released.

(6)
The information processing apparatus according to (5), wherein
the log information includes time information and position information in the period during which the personal authentication is not performed.

(7)
The information processing apparatus according to (6), wherein
the alert unit reflects and presents the log information in a map.

(8)
An information processing method executed by a computer, the information processing method comprising:
estimating a behavior of a user; and
switching, based on an estimation result of the behavior, an authentication method of personal authentication among a gait authentication method, an authentication method other than the gait authentication method, and no lock.

(9)
A program configured to cause a computer to implement
estimating a behavior of a user; and
switching, based on an estimation result of the behavior, an authentication method of personal authentication among a gait authentication method, an authentication method other than the gait authentication method, and no lock.

REFERENCE SIGNS LIST

AL ALERT UNIT
AI SECURITY ALERT
BA BEHAVIOR ANALYSIS UNIT
BE BEHAVIOR ESTIMATION LIBRARY
BR BROADCAST RECEIVER (AUTHENTICATION METHOD SWITCHING UNIT)
MP MAP
RD BEHAVIOR RULE DATABASE
RG REGISTRATION UNIT
RI RECOMMENDATION INFORMATION
TM INFORMATION TERMINAL (INFORMATION PROCESSING APPARATUS)

The invention claimed is:

1. A terminal device comprising:
a memory;
a sensor; and
circuitry configured to
control reception of movement information of a user of the terminal device that is carried by the user, the movement information being detected by the sensor,
estimate a current action of the user based on the movement information, among a plurality of predefined actions,
determine whether the estimated current action is a preset action for personal authentication that is set and stored in the memory,
switch to, based on the determination of the estimated current action of the user, a target authentication method of the personal authentication among a plurality of authentication methods including gait authentication method, under a condition that the estimated current action is not the preset action for the personal authentication.

2. The terminal device according to claim 1, wherein the circuitry is further configured to
detect a new action of the user based on information of action history of the user,
output, via a user interface, the new action as recommendation information, and
register, in a behavior rule database stored in the memory, the new action of the user and at least one of the plurality of authentication methods corresponding to the new action of the user, in response to an input from the user based on the recommendation information.

3. The terminal device according to claim 1, wherein the circuitry is configured to set the gait authentication method for the personal authentication under a condition that the current action of the user is determined as walking, set a first authentication method other than the gait authentication method for the personal authentication under a condition that the current action of the user is determined as stationary or sleeping, and set a second authentication method without security lock for the personal authentication under a condition that the current action of the user is determined as performing a driving operation.

4. The terminal device according to claim 3, wherein the circuitry is further configured to output a security alert on a lock screen under a condition that the personal authentication failed by the gait authentication method.

5. The terminal device according to claim 4, wherein the circuitry is further configured to output, after unlocking the lock screen, under a condition that an operation on the security alert is detected, log information on a period during which the personal authentication failed.

6. The terminal device according to claim 5, wherein the log information includes time information and position information in the period during which the personal authentication failed.

7. The terminal device according to claim 6, wherein the circuitry is further configured to output the log information in a map displayed on a screen.

8. The terminal device according to claim 1, wherein the sensor is at least one of a gyro sensor, a global positioning system (GPS) sensor, a proximity sensor, a distance measuring sensor, or an illuminance sensor.

9. The terminal device according to claim 8, wherein the sensor is configured to detect movement of the user, position of the user, or surrounding brightness of the user as the movement information of the user.

10. The terminal device according to claim 2, wherein the new action is at least one of commuting, running or going out, which is a specific routine action performed by the user in a specific time and spatial location, detected by the sensor.

11. The terminal device according to claim 3, wherein the first authentication method includes at least one of a knowledge authentication method using an identifier or a password, a fingerprint authentication method, or a face authentication method.

12. An information processing method executed by a terminal device, comprising:
controlling reception of movement information of a user of the terminal device that is carried by the user, the movement information being detected by a sensor of the terminal device;
estimating a current action of the user based on the movement information, among a plurality of predefined actions;
determining whether the estimated current action is a preset action for personal authentication that is set; and
switching to, based on the determination of the estimated current action of the user, a target authentication method of the personal authentication among a plurality of authentication methods including gait authentication method, under a condition that the estimated current action is not the preset action for the personal authentication.

13. The information processing method according to claim 12, further comprising:
detecting a new action of the user based on information of action history of the user; and
outputting, via a user interface, the new action as recommendation information,
registering the new action of the user and at least one of the plurality of authentication methods corresponding to the new action of the user, in response to an input from the user based on the recommendation information.

14. The information processing method according to claim 13,
wherein the new action is at least one of commuting, running or going out, which is a specific routine action performed by the user in a specific time and spatial location, detected by the sensor.

15. The information processing method according to claim 12, further comprising:

setting the gait authentication method for the personal authentication under a condition that the current action of the user is determined as walking;

setting a first authentication method other than the gait authentication method for the personal authentication under a condition that the current action of the user is determined as stationary or sleeping; and setting a second authentication method without security lock for the personal authentication under a condition that the current action of the user is determined as performing a driving operation.

16. The information processing method according to claim 15, wherein the first authentication method includes at least one of a knowledge authentication method using an identifier or a password, a fingerprint authentication method, or a face authentication method.

17. A non-transitory computer-readable storage medium including computer executable instructions, wherein the instructions, when executed by a terminal device, cause the terminal device to perform a method, the method comprising:

controlling reception of movement information of a user of the terminal device that is carried by the user, the movement information being detected by a sensor of the terminal device;

estimating a current action of the user based on the movement information, among a plurality of predefined actions;

determining whether the estimated current action is a preset action for personal authentication that is set; and switching to, based on the determination of the estimated current action of the user, a target authentication method of the personal authentication among a plurality of authentication methods including gait authentication method, under a condition that the estimated current action is not the preset action for the personal authentication.

* * * * *